(12) United States Patent
Donze

(10) Patent No.: US 6,948,218 B1
(45) Date of Patent: Sep. 27, 2005

(54) SPRING CLIP APPARATUS

(75) Inventor: William E. Donze, Strongsville, OH (US)

(73) Assignee: Boss Pet Products, Inc., Clayton, MO (US)

( * ) Notice: Subject to any disclaimer, the term of this patent is extended or adjusted under 35 U.S.C. 154(b) by 0 days.

(21) Appl. No.: 10/691,363

(22) Filed: Oct. 22, 2003

(51) Int. Cl.$^7$ ............................................. A44B 13/00
(52) U.S. Cl. ....................... 24/265 H; 24/905; 119/774; 119/792; 54/59; 267/71; 267/74
(58) Field of Search ............................ 24/598.5, 265 H, 24/600.6, 600.7, 595.1, 598.3, 905; 119/797, 119/795, 793, 774, 772, 792; 267/71, 74; 54/59

(56) References Cited

U.S. PATENT DOCUMENTS

| | | | | |
|---|---|---|---|---|
| 703,713 A | * | 7/1902 | Smith et al. ................. | 24/600.6 |
| 865,094 A | * | 9/1907 | Fields ............................ | 54/59 |
| 898,789 A | * | 9/1908 | Schleicher ................. | 24/600.7 |
| 1,235,480 A | * | 7/1917 | Johnson ........................ | 24/905 |
| 2,258,200 A | * | 10/1941 | Baird .......................... | 24/600.6 |
| 2,614,834 A | * | 10/1952 | Tomkins ...................... | 267/71 |
| 3,861,007 A | * | 1/1975 | Silverman .................. | 24/600.6 |
| 4,372,016 A | * | 2/1983 | LaViolette et al. ......... | 24/600.7 |
| 4,689,860 A | * | 9/1987 | Suchowski ................. | 24/600.7 |
| 5,430,914 A | * | 7/1995 | Patterson et al. .......... | 24/598.5 |
| 6,530,345 B2 | | 3/2003 | Donze | |
| 6,612,264 B2 | * | 9/2003 | Levine ........................ | 119/795 |

* cited by examiner

Primary Examiner—Jack W. Lavinder
(74) Attorney, Agent, or Firm—Barnes & Thornburg LLP

(57) ABSTRACT

A spring clip device for use with leashes and dog runs to prevent or reduce the likelihood of injury to pets and their owners. The spring clip assembly includes a closable clip member, a swivel portion, a housing, a sleeve member and a resilient member. The closable clip member is adapted to be connected to the collar of the dog or other animal and is pivotally connected to the housing by use of the swivel portion. The resilient member is positioned within the housing and biases the sleeve member within the housing. The sleeve member is adapted to telescope outward from the housing and compress the resilient member in the event that a force greater than biasing force of the resilient member.

6 Claims, 1 Drawing Sheet

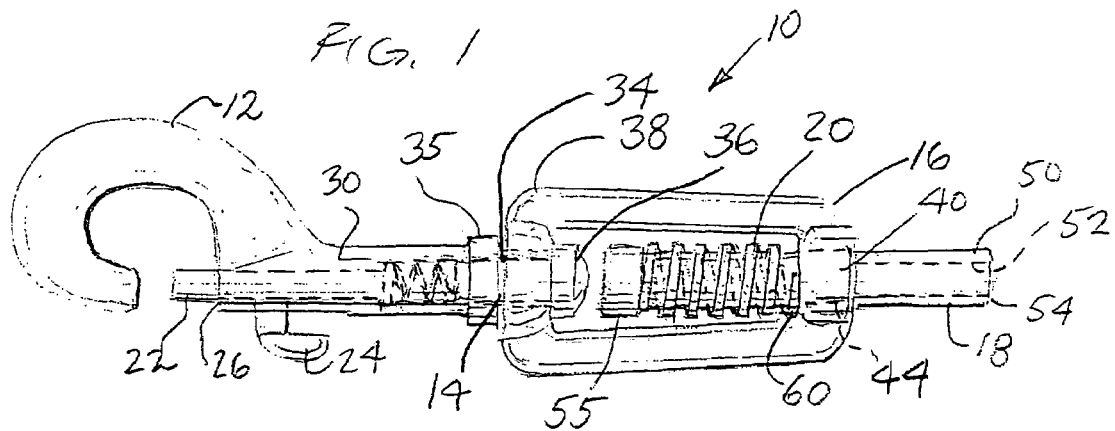
FIG. 1
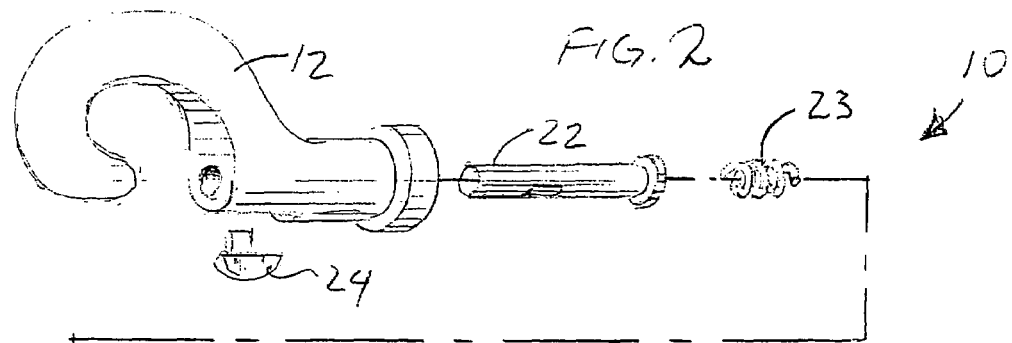
FIG. 2
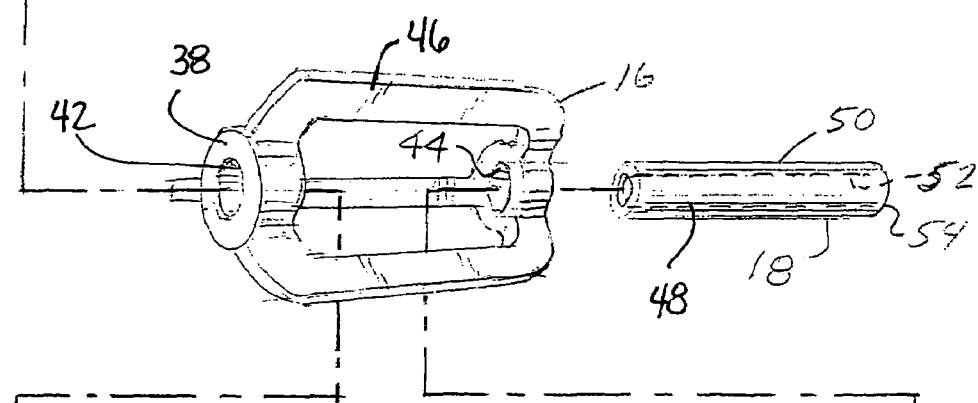
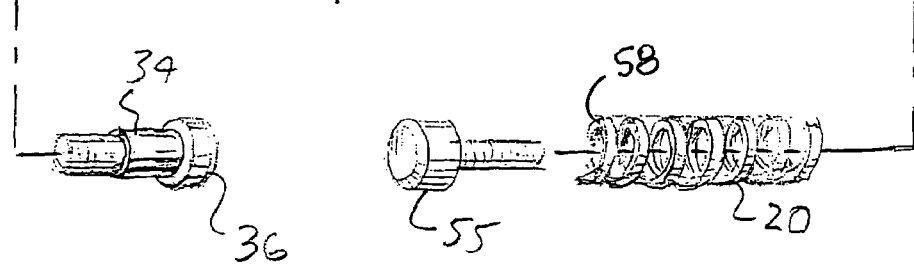

SPRING CLIP APPARATUS

BACKGROUND

This disclosure relates to a spring clip apparatus that is designed to provide a degree of shock absorption to prevent injury to dogs and other animals, such as when they are connected to a dog run or yard stake. The spring clip apparatus also reduces the likelihood of injury to the person walking the animal, in the event the animal suddenly accelerates when on a leash.

Various types of snaps are used on dog runs and leashes to allow for quick attachment to the collar of a dog. A typical snap includes a generally closable clip member with a portion of the clip that can be slid rearward to create an opening, allowing for connection to an attachment ring of a dog's collar. The slidable portion of the clip typically includes a spring to bias the slidable portion to a closed position to retain the attachment ring. Snaps of this nature do not include shock absorbing qualities to prevent injury to the animal or person walking it.

In view of the above, it should be appreciated that there is a need for a snap arrangement that limits excessive forces from being exerted, to prevent or reduce the likelihood of injury. The present invention satisfies these and other needs and provides further related advantages.

SUMMARY

The disclosure includes a spring clip device for use with leashes and dog runs to prevent or reduce the likelihood of injury to pets and their owners.

The spring clip assembly includes a closable clip member, a swivel portion, a housing, a sleeve member and a resilient member. The closable clip member is adapted to be connected to the collar of the dog or other animal and is pivotally connected to the housing by use of the swivel portion. The resilient member is positioned within the housing and biases the sleeve member within the housing. The sleeve member is adapted to telescope outward from the housing and compress the resilient member in the event that a force greater than biasing force of the resilient member is exerted on the sleeve.

The spring clip assembly can be connected to the collar of a dog by opening the clip member and attaching the spring clip assembly to the collar attachment ring. The sleeve member, opposite the clip member is adapted to accept cable, rope, chain or other restraining device. The restraining device can be connected to a dog run or a leash handle. Excessive forces applied to the restraining device such as when the dog or other animal exceeds the biasing force of the resilient member causes the sleeve member to compress the biasing member. The compression of the resilient member creates a cushioning or shock absorbing effect preventing or decreasing the likelihood of injury to the dog or the person walking it.

Other features and advantages of the disclosure will be set forth in part in the description which follows and the accompanying drawings, wherein the embodiments of the disclosure are described and shown, and in part will become apparent upon examination of the following detailed description taken in conjunction with the accompanying drawings.

BRIEF DESCRIPTION OF THE DRAWINGS

The present device will be best understood when reference is made to the detailed description and the accompanying drawings, wherein identical parts are identified by identical reference numbers and wherein:

FIG. 1 is a side elevational view of the spring clip device.

FIG. 2 is an exploded view of the spring clip device of FIG. 1.

DETAILED DESCRIPTION

As illustrated in the drawings, a spring clip assembly 10 is shown that comprises a closable clip member 12, a swivel 14, a housing 16, a sleeve member 18 and a resilient member 20. Specific details of the individual components will now be described.

As shown in the exemplary drawings, and with particular reference to FIG. 1, the spring clip assembly 10 is adapted to be releasably connected to the attachment ring of a collar or halter, worn by dogs and other animals. The spring clip assembly 10 also is adapted to be connected to a flexible lead such as a cable, rope or chain to allow the animal to be walked, or secured in a closed area. The spring clip assembly 10 is particularly useful with a dog run. A dog run is a ring and cable arrangement set up to allow a dog to run in a backyard. A main cable is positioned between two points above the ground typically suspended by posts. A ring is attached to the main cable and is permitted to move freely across the main cable. A lead line restraint device is attached to the ring at a first end and to the spring clip assembly 10 at a second end. The dog, once connected to the lead line, can run the length of the main cable between the posts. When the pulley reaches the end of the main cable, travel of the ring abruptly halts preventing further forward movement of the dog. Without absorbing the impact force, injury or death may result. Use of the spring clip device 10 limits injury to the dog by absorbing shock forces created by the abrupt halting of the forward movement of the dog. The length of the spring and the spring force can be adjusted depending upon the weight of the animal to be secured.

The clip member 12 of the spring clip assembly 10 is adapted to be connected to the attachment ring of a dog collar or the halter of another animal. The clip member 12 is comprised of a slide pin 22 having a tang 24, that allows the slide pin 22 to be selectively opened, creating a passageway in the clip member 12. The passageway formed in the clip member 12 allows for the ingress and egress of the attachment ring of the dog collar or halter. The slide pin 22 is positioned within a bore 26 of the clip member 12 and is biased to a closed position by an internal spring 23. At the end of the clip member 12 is a shaft portion 30 provided with an internally threaded opening for receiving a bolt 32 with a shaft 34 and a head 36, wherein the head 36 has a diameter greater than that of the shaft 34.

The housing 16 of the spring clip assembly 10 is pivotally connected to the shaft portion 30 of the clip member 12 and contains the resilient member 20 and a substantial portion of the sleeve member 18. The housing 16 is preferably fabricated from a metal to provide rigidity, strength and longevity. While metal is preferred, other materials, such as plastic, may be used. The housing 16 includes a first end 38 and a spaced apart second end 40. The first end 38 of the housing 16 includes a first aperture 42 that is adapted to allow the shaft of the bolt 32 to pass through and pivot. A collar 35 positioned on the shaft portion 30 has a larger diameter than the aperture 42 thereby limiting the axial movement of the bolt 32 in either direction.

The second end 40 of the housing 16 includes a second aperture 44 that is axially aligned with the first aperture 42. The first and second ends 38 and 40 are interconnected by a plurality of rib members 46 that form a cage around the resilient member 20 and the sleeve member 18. FIG. 1 illustrates the housing 16 with a rib member 46 removed to allow viewing of the resilient member 20. While the use of rib members 46 is set forth herein, this is not to limit other housing configurations that may be used such as an enclosed housing having a cylindrical or rectangular configuration. The rib members 46 provide rigidity to the housing 16 and prevent damage to the resilient member 20 and sleeve member 18. The housing 16 is designed to withstand the impact forces created on the spring clip assembly 10 by a dog or other animal attached thereto. The rib members 46 also prevent the resilient member 20 from snagging on articles of clothing or other objects.

The sleeve member 18 is adapted to be secured to a cable or lead, in a number of ways known to one of ordinary skill in the art. This could include a cable that is attached to a pet run or a pet "tie out" system or the like. The sleeve member 18 is comprised of a cylindrical metal tube 48 that includes an outer diameter 50, dimensioned to pass through the second aperture 44 of the second end 40. The sleeve member 18 further includes a central bore 52 that is adapted to receive the cable or lead. The sleeve member 18 includes a first end 54 and a spaced apart second end 56. The first end 54 is adapted to receive the cable or lead. Alternatively, the first end 54 could include a fastening arrangement to which the cable, chain lead or rope is secured.

The second end 56 of the sleeve member 18 includes a flange 55 that is adapted to retain the resilient member 20 with respect to the sleeve member 18. While use of a flange 55 is preferred, other types of retaining devices can be used to retain the resilient member 20, such as a cap or nut arrangement. The sleeve member 18 is adapted to extend outward from the second end 40 of the housing 16. When the sleeve member 18 experiences zero load from outside forces, a significant portion of the sleeve member 18 resides within the housing 16 of the spring clip assembly 10. When a load is placed upon the sleeve member 18, the sleeve member 18 slides outward from the housing 16 until the spring 20 is fully compressed.

The resilient member 20 is positioned around the sleeve member 18 and in the preferred embodiment is in the form of an expanded coil spring. The resilient member 20 includes a first end 58 and a spaced apart second end 60. The first end 58 of the resilient member 20 is positioned adjacent to the flange 55 of the sleeve member 18 and the second end is positioned adjacent to the second end 40 of the housing 16. The resilient member 20 is adapted to be compressed when a force is exerted on the sleeve member 18 by a cable. The compression of the resilient member 20 acts to absorb shock received by the sharp tensioning of the cable when pulled upon by a dog or other animal.

In use, the spring clip assembly 10 is first attached to a cable by inserting the cable through the central bore 52 of the sleeve member 18 and securing the cable by knotting the cable at the end, utilizing a locking brad or adhesive.

Once the spring clip assembly 10 is secured to the cable, the clip member 12 is attached to the attachment ring of a dog collar by sliding the slide pin 22 to an open position and inserting the attachment ring into the clip member 12. Once the spring clip assembly 10 is secured to the collar of a dog, the dog can freely move within the confines of the dog run. Use of the spring clip device 10 limits injury to the dog by absorbing shock forces created by the abrupt halting of the forward movement of the dog. In the event the dog is running and reaches the end of the dog run, the extra force exerted on the cable will pull the sleeve member 18 of the spring clip assembly 10 outward from the housing 16 compressing the resilient member 20, thereby absorbing the impact force.

Dual swivel connections are provided in that the clip member 12 can swivel within the housing 16 and a sleeve member 18 can also swivel within the housing.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A shock absorbing spring clip assembly for absorbing a sudden force applied to a flexible lead, said shock absorbing spring clip assembly comprising:
    a housing;
    a spring clip member having a passageway, said spring clip member normally biased to a closed position but selectively movable to an open position for attachment of the spring clip member to a collar or other restraining mechanism;
    a first swivel member, extending from said spring clip member, a portion of which extends into said housing and is relatively rotatable with respect thereto;
    a sleeve member adapted to be secured to the flexible lead, said sleeve member extending partially into said housing and laterally movable and relatively rotatable with respect thereto, the sleeve member and housing constituting a second swivel; and
    a resilient biasing member positioned between said sleeve member and said housing and adapted to urge said sleeve member into said housing and adapted, when force is exerted to compress said biasing member, to absorb shock transmitted from said spring clip member to the flexible lead;
    wherein said spring clip member remains in a closed position and said sleeve member is drawn outwardly from said housing when a sudden load is placed upon the flexible lead.

2. The shock absorbing spring clip of 1, further including a slide pin associated with said spring clip, said slide pin adapted to close an entranceway in said spring clip.

3. The shock absorbing spring clip of 1, wherein said housing includes an aperture adjusted to allow said sleeve member to pass there through.

4. The shock absorbing spring clip of 1, wherein said housing is in the form of a cage having a first end and a spaced apart second end.

5. The shock absorbing spring clip of 4, wherein said cage includes a plurality of ribs interconnecting said first end to said second end.

6. The shock absorbing spring clip of claim 1, wherein said sleeve member includes a flange adapted to retain said resilient biasing member.

* * * * *